Sept. 20, 1938.  P. L. CRITTENDEN  2,130,615
MAGNETIC BRAKE SHOE
Filed Oct. 15, 1936
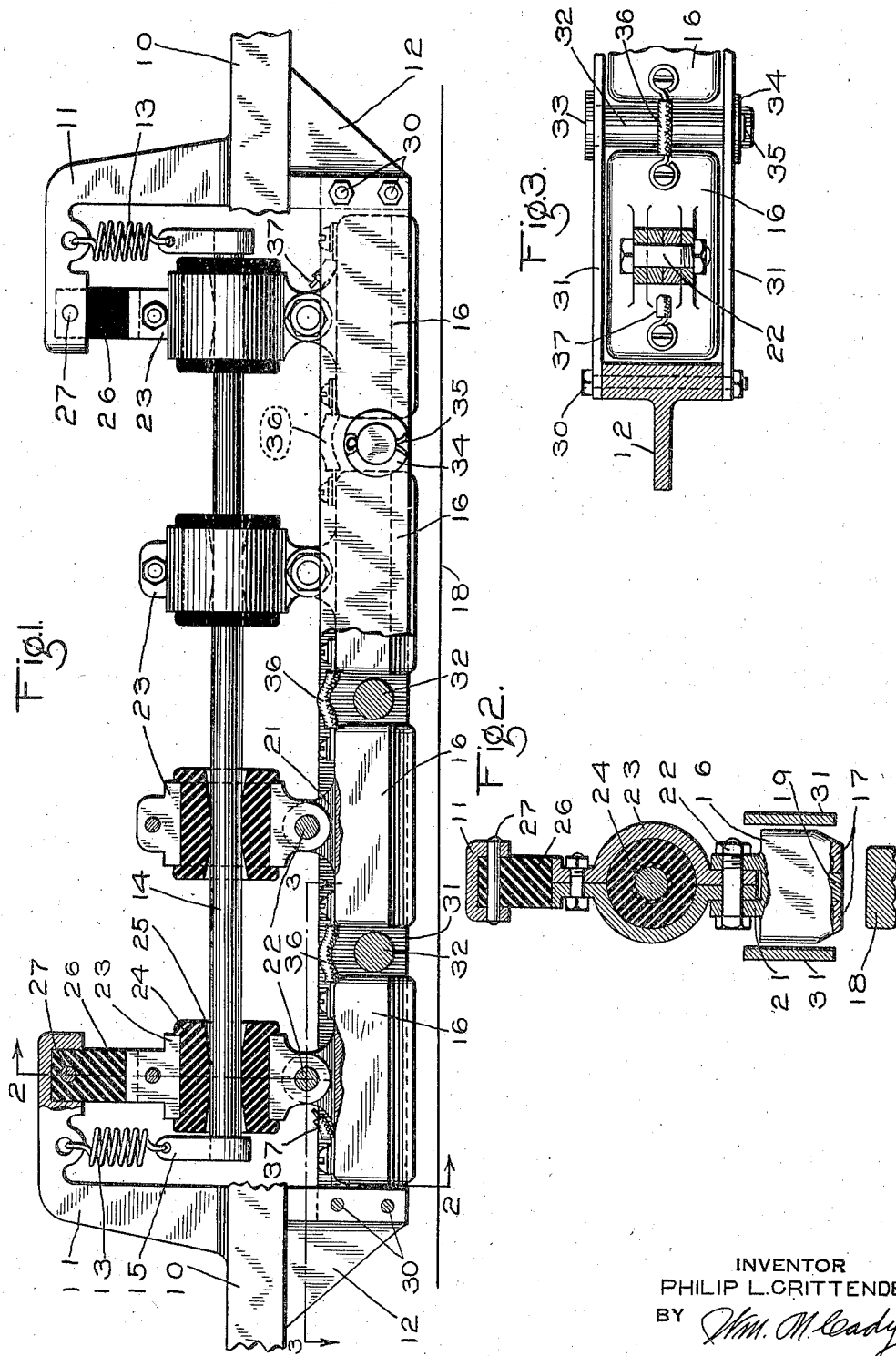
INVENTOR
PHILIP L. CRITTENDEN
BY Wm. M. Cady
ATTORNEY Patented Sept. 20, 1938

2,130,615

UNITED STATES PATENT OFFICE 2,130,615

MAGNETIC BRAKE SHOE

Philip L. Crittenden, Edgewood, Pa., assignor to The Westinghouse Air Brake Company, Wilmerding, Pa., a corporation of Pennsylvania Application October 15, 1936, Serial No. 105,637

7 Claims. (Cl. 188—165)

This invention relates to magnetic brake shoes, and in particular to magnetic track brake shoes adapted to be suspended from a vehicle truck frame over a track rail.

Magnetic track brakes have been employed in recent years on high speed railway trains and traction vehicles in order to secure additional braking, so as to stop the train or vehicle in very short distances. In order to obtain the necessary additional braking force, the rail-engaging shoes of the magnetic track brake devices have been made relatively long. As the rail-engaging shoes slide over the track rails considerable heat is generated, causing in many instances some distortion of the relatively long shoes, and thereby resulting in poor contact between the shoes and rails.

Moreover, even when such distortion is not caused by heating of the shoes, the contour of the rail is often irregular, which also contributes to a poor contact. This poor contact, whether due to heating of the shoes or irregularities in the rail, reduces the effectiveness of the magnetic track brake devices, and thereby reduces the possible braking force which may be produced. In some instances, it has been observed that poor contact reduces the braking force to one half of its possible value.

It is an object of the present invention to provide a magnetic track brake shoe construction comprising a plurality of individual magnetic track brake devices so constructed and arranged as to permit of a maximum contact between the rail-engaging shoes and the rails under all normal temperature conditions of the track brake devices, as well as when irregularities in the rail contour exist.

Further objects and advantages of the invention, dealing with specific constructions and arrangements of parts, will be more fully understood from the following description, which is taken in connection with the attached drawing, wherein—

Fig. 1 shows in elevation an embodiment of the invention.

Fig. 2 is a sectional view taken along the line 2—2 of Fig. 1.

Fig. 3 is a view taken along the line 3—3 of Fig. 1.

Referring now to these figures of the drawing, a vehicle truck frame is indicated by the fragmentary portions 10, and attached to or integral with the truck frame are two upwardly extending brackets 11, and two downwardly extending brackets 12. A suspension spring 13 is attached to an eye in each of the upwardly extending brackets 11. The two suspension springs 13 carry a rod 14, being connected to each end of the rod by a lug 15.

The rod 14 serves as a common support for a plurality of track brake devices 16. Each of these track brake devices may be of conventional design, preferably of the parallel pole shoe type, that is, each device comprises an energizing winding adapted upon energization to produce magnetism in two rail-engaging shoes 17 arranged in parallel spaced relationship and extending longitudinally of a track rail 18. A non-magnetic spacer 19 is usually provided to maintain the rail engaging shoes 17 in spaced relationship.

Each track brake device 16 is provided with upwardly extending lugs 21, which are pivotally secured by means of a bolt 22 to a tubular clamp member 23 comprising two half sections. Disposed within the tubular clamp member 23 is a bushing 24, preferably made of soft rubber or like material. The bushing 24 has extending therethrough an aperture 25 which preferably tapers outwardly from the center line of the bushing, as is clearly indicated in Fig. 1.

The two clamps 23 attached to the two end brake shoe devices 16, respectively, are adapted to abut against stops 26 of rubber, or the like, when the shoe devices are held in their raised position above the rail 18. The stops 26 are secured to the upwardly extending brackets 11 by pins or rivets 27.

Attached to the two downwardly extending brackets 12 by bolts are two side plates 31. As will be observed from the drawing, these side plates extend longitudinally of the rail 18 along the sides of the track brake devices 16. Between each pair of track shoe devices 16 is a bumper or thrust pin 32, extending transversely between the two side plates 31, for the purpose of taking the thrust of each shoe device during a braking operation. The thrust pins 32 preferably comprise an integral head 33 at one end, and may be held in place by a washer 34 and cotter pin 35 suitably placed at the other end.

The several magnetic track brake devices 16 preferably have their windings connected in series by jumpers 36, although there is no objection to connecting the several track brake devices in parallel. Current may be supplied to the combination through conductors 37.

In operation, when the windings of the several track brake devices are deenergized the suspension springs 13 hold the assembly in the raised position illustrated in Fig. 1, where the two end clamps 23 abut against the stops 26.

When current is supplied to the combination of track brake devices, they are attracted to and in engagement with the track rail 18 by virtue of their own magnetism. As the track brake devices engage the track rail, each may align itself with the rail to secure the maximum contact, due to the fact that the pivotal connection provided by the bolts 22, as well as the soft rubber bushing 24, permit individual movement of each track shoe device. Thus as the rail-engaging shoes 17 heat up, or as irregularities in the contour of the rail pass under the shoes, each track brake device may move with whatever freedom of movement is required to maintain the maximum contact with the rail. It follows, therefore, that with the arrangement shown a greater contact will be obtained than in a single brake device having rail-engaging shoes of equivalent length. It will, of course, be apparent that the thrust produced by each brake shoe device 16 will be transmitted to the truck frame 10 by reaction of the track brake devices upon the bumpers or pins 32.

I have illustrated and described the track brake devices 16 as preferably being of the parallel pole shoe type, but it is obvious that a mounting construction embodying features of my invention may be adapted with advantage to other types of brake devices, as, for example, the so-called multiple pole shoe type which has a plurality of pole-shoes spaced apart longitudinally of, and each of which extends transversely of, a track rail.

While I have illustrated my invention with particular reference to one specific construction, it is not my intention to be limited to these exact details, or otherwise than by the spirit and scope of the appended claims.

Having now described my invention, what I claim as new and desire to secure by Letters Patent, is:

1. In a magnetic track brake construction, a plurality of magnetic track brake devices, a common support member for all of said track brake devices, means including at least one resilient and yieldable element for supporting said brake devices from said common support member, said yielding element permitting each of said track brake devices to move relative to said support member, whereby when said brake devices are in contact with a rail each track brake device may align itself with the rail independent of the other brake devices, and spring means for supporting said common support member from a vehicle truck frame.

2. In a magnetic track brake construction, in combination, a plurality of magnetic track brake devices, an individual supporting member for and attached to each of said track brake devices, each of said supporting members having an aperture extending therethrough, a bushing of yieldable material disposed in the aperture of each of said supporting members, a continuous element extending through the bushing in each of said supporting members, and spring means for supporting said element from a vehicle truck.

3. In a magnetic track brake construction, in combination, a vehicle truck, a continuous supporting element, spring means for supporting said element from said truck, a plurality of clamps disposed on said element, a bushing of relatively soft and pliable material interposed between each of said clamps and said element, and a plurality of track brake devices each of which is individually pivotally connected to one of said clamps.

4. In a magnetic track brake construction, in combination, a vehicle truck, a common support member, spring means for supporting said member from said truck, a plurality of magnetic track brake devices, means for resiliently supporting said magnetic track brake devices from said support member in an end-to-end arrangement longitudinally of and above a track rail, a pair of plates connected to said truck frame and extending on either side of said track brake devices, and thrust receiving elements between each adjacent pair of track brake devices extending between said plates for receiving the thrust produced by said track brake devices.

5. In a vehicle brake of the magnetic track shoe type, in combination, a plurality of magnetic track brake devices disposed in end-to-end relationship, a supporting clamp pivotally connected to each of said track brake devices, said clamp having an aperture extending therethrough, a bushing of relatively soft rubber disposed in the aperture of each of said clamps, a continuous rod extending through each of said bushings, spring means for supporting said rod from a vehicle truck, and means for transmitting to the vehicle truck the braking effect produced by each of said track brake devices, the said parts enumerated being so constructed and arranged as to permit each track brake device to align itself with the track rail independent of the other track brake devices.

6. In a magnetic track brake construction, in combination, a vehicle truck, a plurality of magnetic track brake devices disposed in end-to-end relationship, a thrust plate on either side of said magnetic track brake devices connected to said vehicle truck, thrust receiving elements disposed between each pair of adjacent track brake devices and connecting with said side plates, a clamp member for and pivotally connected to each of said track brake devices, a common supporting member for supporting the clamps connected to each track brake device, a relatively soft and yieldable element interposed between each of said clamps and said common support member, and spring means for supporting said common support member from the vehicle truck.

7. In a magnetic track brake construction, a plurality of magnetic track brake devices, a common support member for all of said track brake devices, means connecting said track brake devices to said common support member and to each other, and so constructed and arranged as to permit each track brake device to align itself with a track rail independent of the other track brake devices, and spring means for resiliently supporting said common support member from a vehicle truck.

PHILIP L. CRITTENDEN.